(12) United States Patent
Lin (10) Patent No.: US 10,859,784 B2
(45) Date of Patent: Dec. 8, 2020

(54) OPTICAL ASSEMBLY AND CAMERA MODULE

(71) Applicants: LITE-ON ELECTRONICS (GUANGZHOU) LIMITED, Guangzhou (CN); Lite-On Technology Corporation, Taipei (TW)

(72) Inventor: Tsung-Yu Lin, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 109 days.

(21) Appl. No.: 15/889,232

(22) Filed: Feb. 6, 2018

(65) Prior Publication Data

US 2018/0224623 A1 Aug. 9, 2018

Related U.S. Application Data

(60) Provisional application No. 62/455,556, filed on Feb. 6, 2017.

(30) Foreign Application Priority Data

Feb. 1, 2018 (CN) .......................... 2018 1 0100566

(51) Int. Cl.
*G02B 7/02* (2006.01)
*G02B 13/00* (2006.01)

(52) U.S. Cl.
CPC .............. *G02B 7/021* (2013.01); *G02B 7/025* (2013.01); *G02B 13/004* (2013.01)

(58) Field of Classification Search
CPC ...... G02B 13/0045; G02B 1/041; G02B 9/62; G02B 7/02; G02B 7/021; G02B 7/025; G02B 13/004; G02B 7/022
See application file for complete search history.

(56) References Cited

U.S. PATENT DOCUMENTS 6,563,652 B2   5/2003   Sudoh
9,621,772 B2   4/2017   Schmieder et al.
(Continued)

FOREIGN PATENT DOCUMENTS

CN   101983348   3/2011
CN   102375196   3/2012
(Continued)

OTHER PUBLICATIONS

"Office Action of China Counterpart Application", dated Dec. 18, 2019, p. 1-p. 7.
(Continued)

*Primary Examiner* — Joseph P Martinez
(74) *Attorney, Agent, or Firm* — JCIPRNET (57) ABSTRACT

An optical assembly and a camera module are provided, including a first submodule and a second submodule. The first submodule includes a first lens barrel and a first lens group disposed in the first lens barrel. The second submodule includes a second lens barrel and a second lens group disposed in the second lens barrel. The first lens group and the first lens barrel have a first major engagement mechanism and a first auxiliary engagement mechanism, respectively. The second lens group and the second lens barrel have a second major engagement mechanism and a second auxiliary engagement mechanism, respectively. The first auxiliary engagement mechanism and the second auxiliary engagement mechanism are assembled to form an auxiliary engagement section. The first major engagement mechanism and the second major engagement mechanism are assembled to form a major engagement section.

19 Claims, 4 Drawing Sheets

(56) References Cited

U.S. PATENT DOCUMENTS

| | | | |
|---|---|---|---|
| 2013/0176625 A1 | 7/2013 | Chen | |
| 2015/0301303 A1* | 10/2015 | Kim | B32B 37/1292 |
| | | | 348/373 |
| 2016/0282580 A1 | 9/2016 | Koyama et al. | |

FOREIGN PATENT DOCUMENTS

| | | |
|---|---|---|
| CN | 104516081 | 4/2015 |
| CN | 105005131 | 10/2015 |
| CN | 105353489 | 2/2016 |
| CN | 105717603 | 6/2016 |
| TW | M451549 | 4/2013 |
| TW | 201430433 | 8/2014 |
| TW | 201447413 | 12/2014 |
| TW | M527093 | 8/2016 |

OTHER PUBLICATIONS

"Office Action of Taiwan Counterpart Application," dated Jan. 8, 2019, p. 1-p. 6.

"Office Action of China Counterpart Application", dated Jun. 24, 2020, p. 1-p. 8.

\* cited by examiner

OPTICAL ASSEMBLY AND CAMERA MODULE

CROSS-REFERENCE TO RELATED APPLICATION

This application claims the priority benefits of U.S. provisional application Ser. No. 62/455,556, filed on Feb. 6, 2017 and China application serial no. 201810100566.X, filed on Feb. 1, 2018. The entirety of each of the above-mentioned patent applications is hereby incorporated by reference herein and made a part of this specification.

BACKGROUND OF THE INVENTION

1. Field of the Invention

The invention relates to an optical module, and particularly relates to an optical assembly and a camera module.

2. Description of Related Art

As multimedia entertainment becomes more and more popular, camera devices and projection devices gradually become an indispensable part of life. In these devices, camera modules play an important role. Besides, as the user's demands on image capturing and playback qualities are increasing, the number of lenses used in the lens modules is also increasing. However, with the increase in the number of lenses, the yield may be affected during the assembling process of the lens modules. How to rule out these factors to improve the yield has become an issue in related fields.

The conventional lens module accommodates all the lenses within a single lens barrel. During the assembling process, the respective lenses are sequentially placed in the lens barrel. Thus, in this lens module, the arrangement or orientation among the lenses cannot be adjusted once the assembling is completed. For example, the concentricity of a lens group cannot be further modified. If the concentricity of the lenses in the assembled lens module is insufficient, the lens module may be considered as a defective product and discarded. Thus, the unadjustable lenses which have been assembled in the barrel is a key factor that may affect the yield.

SUMMARY OF THE INVENTION

One or some exemplary embodiments of the invention provide an optical assembly having an improved yield and reliability.

One or some exemplary embodiments of the invention provide a camera module with an optical assembly having a desirable yield and reliability.

An embodiment of the invention provides an optical assembly including a first submodule and a second submodule. The first submodule includes a first lens band and a first lens group disposed in the first lens barrel. The second submodule includes a second lens barrel and a second lens group disposed in the second lens barrel. The first lens group and the first lens barrel have a first major engagement mechanism and a first auxiliary engagement mechanism, respectively. The second lens group and the second lens barrel have a second major engagement mechanism and a second auxiliary engagement mechanism, respectively. The first auxiliary engagement mechanism and the second auxiliary engagement mechanism are assembled to form an auxiliary engagement section, and the first major engagement mechanism and the second major engagement mechanism are assembled to form a major engagement section.

An embodiment of the invention provides a camera module. The camera module includes a sensor, a holder, and an optical assembly. The holder is disposed above the sensor. The optical assembly is disposed on the holder and located above the sensor. The optical assembly includes a first submodule and a second submodule. The first submodule includes a first lens barrel and a first lens group disposed in the first lens barrel. The second submodule includes a second lens barrel and a second lens group disposed in the second lens barrel. The first lens group and the first lens barrel have a first major engagement mechanism and a first auxiliary engagement mechanism, respectively. The second lens group and the second lens barrel have a second major engagement mechanism and a second auxiliary engagement mechanism, respectively. The first auxiliary engagement mechanism and the second auxiliary engagement mechanism are assembled to form an auxiliary engagement section. The first major engagement mechanism and the second major engagement mechanism are assembled to form a major engagement section.

According to an embodiment, in the optical assembly, the first major engagement mechanism has a first major contact surface and a first major lateral surface connected to the first major contact surface, the second major engagement mechanism has a second major contact surface and a second major lateral surface connected to the second major contact surface, the first auxiliary engagement mechanism has a first auxiliary contact surface and a first auxiliary lateral surface connected to the first auxiliary contact surface, and the second auxiliary engagement mechanism has a second auxiliary contact surface and a second auxiliary lateral surface connected to the second auxiliary contact surface. In addition, the first major engagement mechanism and the second major engagement mechanism form the major engagement section by the first major contact surface and the second major contact surface contacting each other, a major engagement gap is formed between the first major lateral surface and the second major lateral surface, the first auxiliary engagement mechanism and the second auxiliary engagement mechanism form the auxiliary engagement section by the first auxiliary contact surface and the second auxiliary contact surface contacting each other, and an auxiliary engagement gap is formed between the first auxiliary lateral surface and the second auxiliary lateral surface. Moreover, a gap width of the auxiliary engagement gap in a normal direction of the first auxiliary lateral surface is greater than a gap width of the major engagement gap in a normal direction of the first major lateral surface.

According to an embodiment, the optical assembly satisfies relations as follows: 0 μm<$G1$<50 μm and 0.05 mm<$G2$<1 mm, wherein $G1$ is the gap width of the major engagement gap in the normal direction of the first major lateral surface, and $G2$ is the gap width of the auxiliary engagement gap in the normal direction of the first auxiliary lateral surface.

According to an embodiment of the invention, in the optical assembly, the first major lateral surface is inclined relative to the first major contact surface, the second major lateral surface is inclined relative to the second major contact surface, the first auxiliary lateral surface is inclined relative to the first auxiliary contact surface, and the second auxiliary lateral surface is inclined relative to the second auxiliary contact surface.

According to an embodiment of the invention, the first major contact surface, the second major contact surface, the first auxiliary contact surface, and the second auxiliary contact surface of the optical assembly are parallel to each other.

According to an embodiment of the invention, an orthogonal projection length of an orthogonal projection of the first major lateral surface of the first major engagement mechanism onto a normal of the first major contact surface is less than an orthogonal projection length of an orthogonal projection of the first auxiliary lateral surface of the first auxiliary engagement mechanism onto a normal of the first auxiliary contact surface.

According to an embodiment of the invention, a bonding section is arranged between the first lens barrel and the second lens barrel in a position other than the first major engagement mechanism and the second major engagement mechanism.

Based on the above, in the optical assembly and the camera module according to the embodiments of the invention, the optical assembly is divided into two submodules, wherein the first submodule and the second submodule are assembled through the major engagement section and the auxiliary engagement section, respectively. Therefore, after the first lens group and the second lens group are respectively placed into the first lens barrel and the second lens barrel, the concentricity between the first lens group of the first submodule and the second lens group of the second submodule can be adjustable through translationally moving or rotating the lens barrels. Thus, the circumstance where the concentricity of lenses is unable to be further optimized after the lenses are placed into a single lens barrel is avoided. The optical assembly and the camera module according to the embodiments of the invention thus have an enhanced yield and reliability.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1A:
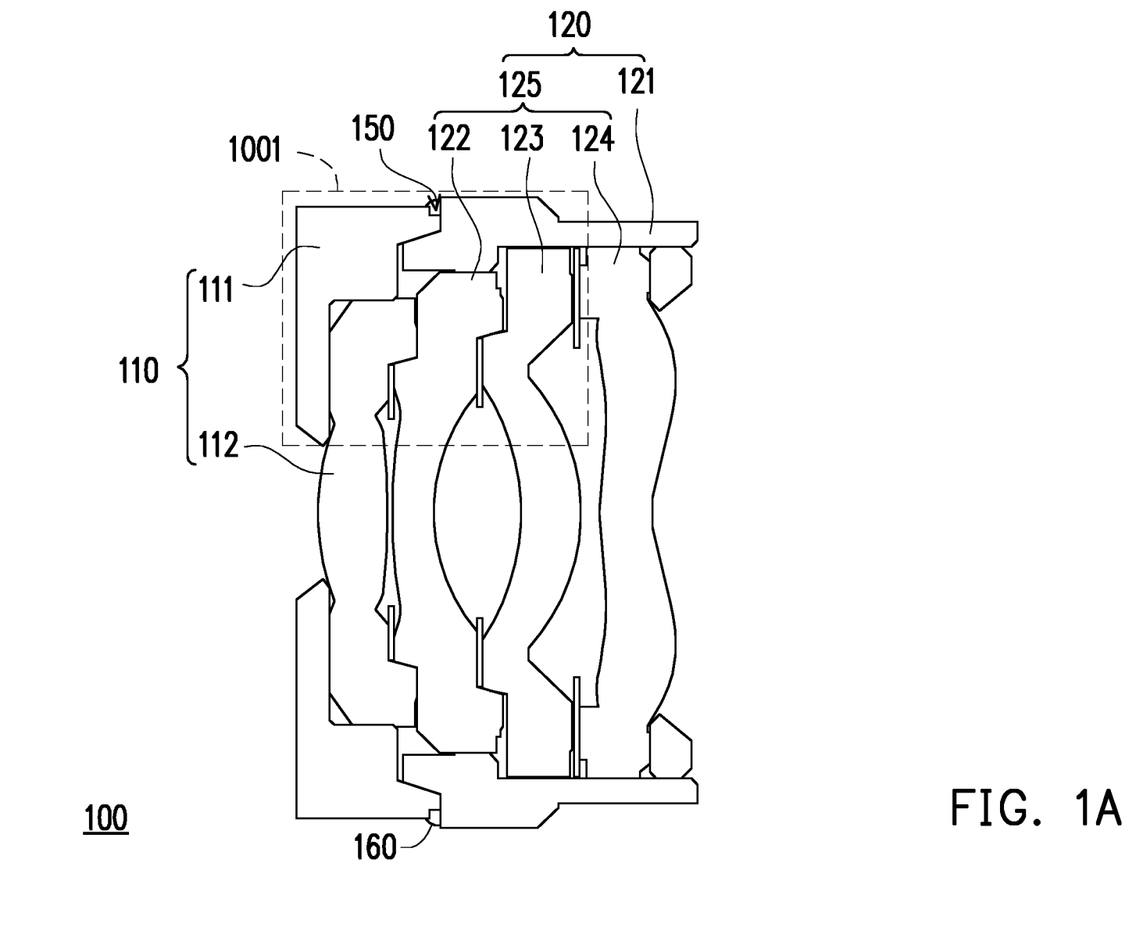
FIG. 1A is a schematic cross-sectional view illustrating an optical assembly according to an embodiment of the invention.
Figure 1B:
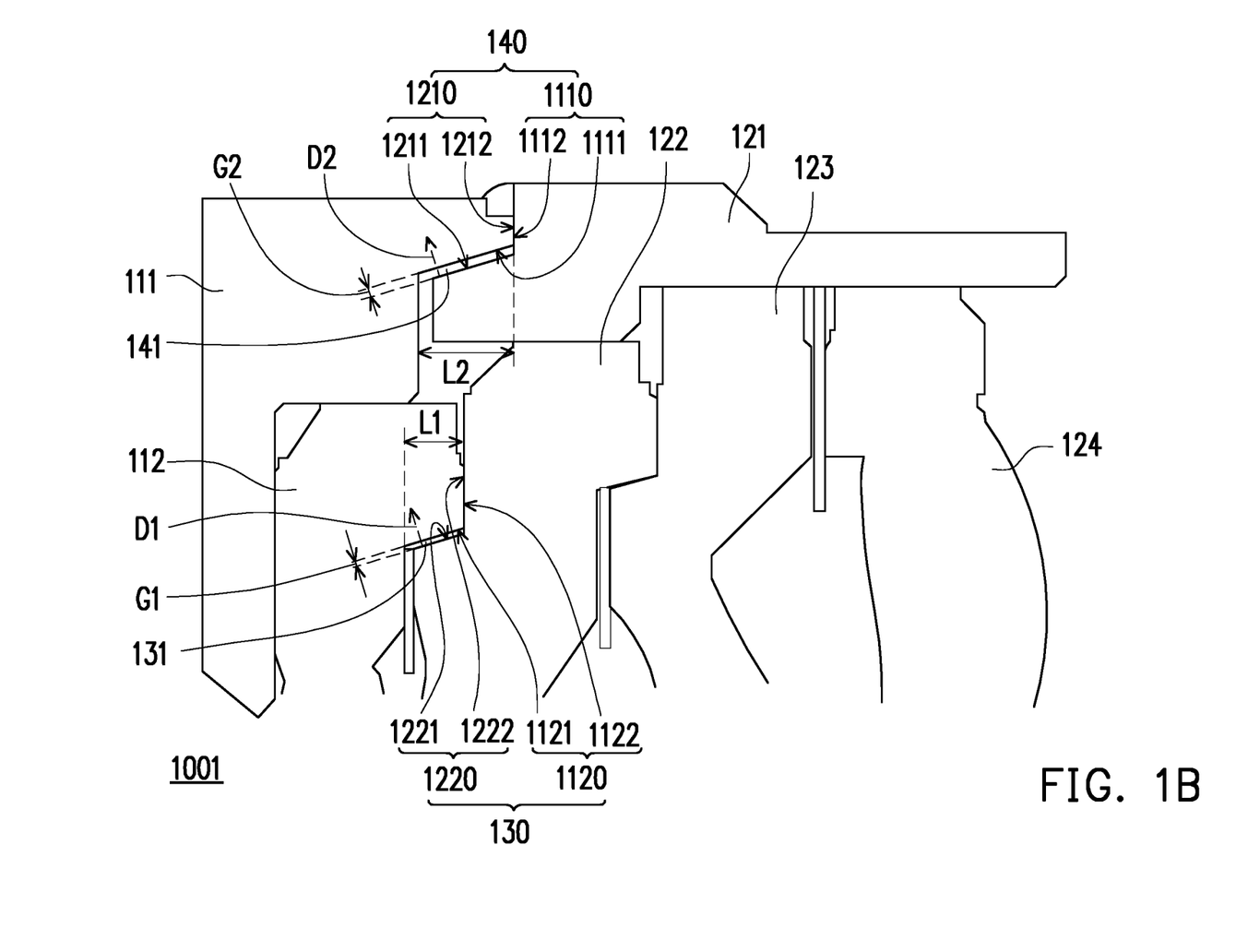
FIG. 1B is a schematic enlarged cross-sectional view illustrating a region marked with a broken line in FIG. 1A.

FIG. 1A is a schematic cross-sectional view illustrating an optical assembly according to an embodiment of the invention. FIG. 1B is a schematic enlarged cross-sectional view illustrating a region 1001 marked with a broken line in FIG. 1A. Referring to FIGS. 1A and 1B, an optical assembly 100 of the embodiment includes a first submodule 110 and a second submodule 120. The first submodule 110 includes a first lens barrel 111 and a first lens group 112 disposed in the first lens barrel 111. In addition, the first lens group 112 and the first lens barrel 111 have a first major engagement mechanism 1120 and a first auxiliary engagement mechanism 1110, respectively. The second submodule 120 includes a second lens barrel 121 and a second lens group 125 disposed in the second lens barrel 121. In addition, the second lens group 125 and the second lens barrel 121 have a second major engagement mechanism 1220 and a second auxiliary engagement mechanism 1210, respectively. The first auxiliary engagement mechanism 1110 and the second auxiliary engagement mechanism 1210 are loosely fit to each other, and the first major engagement mechanism 1120 and the second major engagement mechanism 1220 are slightly-loosely fit to each other. Here, the description "slightly-loosely fit" indicates a degree of fitting tighter or more accurate than "loosely fit", but looser than "tightly fit". In an embodiment, a loose running fit is formed after the first auxiliary engagement mechanism 1110 and the second auxiliary engagement mechanism 1210 are joined, while a sliding fit or a precision running fit or a close running fit is formed after the first major engagement mechanism 1120 and the second major engagement mechanism 1220 are joined. In other words, the clearance between the first major engagement mechanism 1120 and the second major engagement mechanism 1220 after assembling is smaller than the clearance between the first auxiliary engagement mechanism 1110 and the second auxiliary engagement mechanism 1210 after assembling, wherein the clearances of the engagement mechanisms allow the two mating engagement mechanisms to move, slide or rotate relatively. The descriptions of "loose running fit", "tight fit", "close running fit", "precision running fit", or "sliding fit" are all fitting types well-known to people having ordinary skills in the art after considering the sizes and tolerances between the mating engagement mechanisms. Thus, no additional definitions are made herein. In an embodiment, the first auxiliary engagement mechanism 1110 and the second auxiliary engagement mechanism 1210 are assembled to form an auxiliary engagement section 140, and the first major engagement mechanism 1120 and the second major engagement mechanism 1220 are assembled to form a major engagement section 130.

Referring to FIG. 1B, the first major engagement mechanism 1120 has a first major contact surface 1122 and a first major lateral surface 1121 connected to the first major contact surface 1122. The second major engagement mechanism 1220 has a second major contact surface 1222 and a second major lateral surface 1221 connected to the second major contact surface 1222. The first auxiliary engagement mechanism 1110 has a first auxiliary contact surface 1112 and a first auxiliary lateral surface 1111 connected to the first auxiliary contact surface 1112. The second auxiliary engagement mechanism 1210 has a second auxiliary contact surface 1212 and a second auxiliary lateral surface 1211 connected to the second auxiliary contact surface 1212. The first major engagement mechanism 1120 and the second major engagement mechanism 1220 form the major engagement section 130 by the first major contact surface 1122 and the second major contact surface 1222 contacting each other. In addition, a major engagement gap 131 is formed between the first major lateral surface 1121 and the second major lateral surface 1221. The first auxiliary engagement mechanism 1110 and the second auxiliary engagement mechanism 1210 form the auxiliary engagement section 140 by the first auxiliary contact surface 1112 and the second auxiliary contact surface 1212 contacting each other. In addition, an auxiliary engagement gap 141 is formed between the first auxiliary lateral surface 1111 and the second auxiliary lateral surface 1211.

Referring to FIG. 1B, the first lens barrel 111 has the first auxiliary engagement mechanism 1110 of the first submodule 110, and the first lens group 112 has the first major engagement mechanism 1120 of the first submodule 110. The second lens barrel 121 has the second auxiliary engagement mechanism 1210 of the second submodule 120. The second lens group 125 has the second major engagement mechanism 1220 of the second submodule 120. More specifically, the second lens group 125 includes a lens 122, a lens 123, and a lens 124 sequentially arranged from a side closest to the first lens group 112 toward a side away from the first lens group 112. The first major engagement mechanism 1120 and the second major engagement mechanism 1220 are respectively formed on the first lens group 112 and the lens 122 of the second lens group 125, as the lens 122 is a lens closest to the first lens group 112 in the second lens group 125. In addition, the first major engagement mechanism 1120 and the second major engagement mechanism 1220 are adjacent and opposite to each other. In an embodiment, since the first major engagement mechanism 1120 and the second major engagement mechanism 1220 of the major engagement section 130 are respectively disposed on the first lens group 112 and the lens 122 of the second lens group 125, the first lens group 112 and the second lens group 125 may have an improved concentricity after the first submodule 110 and the second submodule 120 are assembled and well aligned.

In the optical assembly 100 of the embodiment, the optical assembly 100 is divided into the first submodule 110 and the second submodule 120, and the first submodule 110 and the second submodule 120 are joined through the major engagement section 130 and the auxiliary engagement section 140, respectively. Therefore, after the first lens group 112 and the second lens group 125 are respectively placed into the first lens barrel 111 and the second lens barrel 121 and before the first lens barrel 111 and the second lens barrel 121 are bonded and fixed together, the concentricity of the first lens group 112 of the first submodule 110 and the second lens group 125 of the second submodule 120 is still adjustable with five or six degrees of freedom via a translational movement or rotation of the lens barrels to obtain a desirable imaging quality. Therefore, the circumstance where the concentricity of lenses is unable to be further optimized after the lenses are placed into a single lens barrel is avoided. As a consequence, the optical assembly 100 of the embodiment has an enhanced yield and reliability.

Referring to FIG. 1B, in an embodiment, the first major contact surface 1122 and the second major contact surface 1222 of the major engagement section 130 and the first auxiliary contact surface 1112 and the second auxiliary contact surface 1212 of the auxiliary engagement section 140 are parallel to one another. In addition, an orthogonal projection length L1 of an orthogonal projection of the first major lateral surface 1121 of the first major engagement mechanism 1120 onto a normal of the first major contact surface 1122 is less than an orthogonal projection length L2 of an orthogonal projection of the first auxiliary lateral surface 1111 of the first auxiliary engagement mechanism 1110 onto a normal of the first auxiliary contact surface 1112. With the design, in a guiding process of the first submodule 110 and the second submodule 120 during the assembling, the first auxiliary engagement mechanism 1110 of the auxiliary engagement section 140 can firstly contact the second auxiliary engagement mechanism 1210 of the auxiliary engagement section 140. Therefore, the risk that the major engagement section 130 is crashed and damaged can be mitigated when the first submodule 110 is joined to the second submodule 120 during the assembling process of the optical assembly 100.

Referring to FIG. 1B, in an embodiment, a gap width G1 of the major engagement gap 131 in a normal direction D1 of the first major lateral surface 1121 is less than a gap width G2 of the auxiliary gap 141 in a normal direction D2 of the first auxiliary lateral surface 1111. When the optical assembly 100 is assembled, the first submodule 110 may be translationally moved or rotated on a contact surface with respect to the second submodule 120 to optimize the imaging quality of the optical assembly 100. In another embodiment, if the optical assembly 100 satisfies relations as follows: 0 µm<G1<50 µm and 0.05 mm<G2<1 mm, a further desirable or improved imaging effect may be obtained.

Referring to FIG. 1B, in the guiding process of assembling the first submodule 110 to the second submodule 120, since the major engagement section 130 and the auxiliary engagement section 140 are respectively located on the lens groups and the lens barrels, the major engagement section 130 located at a part different from the auxiliary engagement section 140 can be protected by the structural design of the auxiliary engagement section 140. Accordingly, in subsequent alignment and quality measurement processes, the concentricity of the first submodule 110 and the second submodule 120 may be adjustable through the structural design of the major engagement section 130, so as to optimize the imaging quality of the optical assembly 100 and reduce the crashed or damaged lens groups through the of the auxiliary engagement section 140.

Referring to FIG. 1B, in an embodiment, the first major lateral surface 1121 is inclined relative to the first major contact surface 112. An interior angle inside the lens material between the first major lateral surface 1121 and the first major contact surface 1122 is greater than 90 degrees and less than 180 degrees, for example. The second major lateral surface 1221 is inclined relative to the second major contact surface 1222. An exterior angle outside the lens material between the second major lateral surface 1221 and the second major contact surface 1222 is greater than 90 degrees and less than 180 degrees, for example. The first auxiliary lateral surface 1111 is inclined relative to the first auxiliary contact surface 1112. An interior angle inside the lens material between the first auxiliary lateral surface 1111 and the first auxiliary contact surface 1112 is greater than 90 degrees and less than 180 degrees, for example. The second auxiliary lateral surface 1211 is inclined relative to the second auxiliary contact surface 1212. An exterior angle outside the lens material between the second auxiliary lateral surface 1211 and the second auxiliary contact surface 1212 is greater than 90 degrees and less than 180 degrees, for example. Accordingly, when the first submodule 110 and the second submodule 120 are assembled, such as in the process of guiding the first submodule 110 to the second submodule 120, the configuration of the inclined first auxiliary lateral surface 111 and the second auxiliary lateral surface 1211 can effectively guide the first submodule 110 to mate and join with the second submodule 120, thereby preventing the first lens group 112 of the first submodule 110 from crashing into the second lens group 125 of the second submodule 120 and being damaged.

Referring to FIG. 1A, in an embodiment, a bonding section 150 is formed at where the first lens barrel 111 and the second lens barrel 121 are connected. In addition, the bonding section 150 is arranged in a position other than the first major engagement mechanism 1120 and the second major engagement mechanism 1220. The bonding section 150, for example, does not contact the first major engagement mechanism 1120 and the second major engagement mechanism 1220. In an embodiment, the bonding section 150, the major engagement section 130, and the auxiliary engagement section 140 are respectively disposed in different positions. The bonding section 150 includes a bonding adhesive 160 to bond the first lens barrel 111 and the second lens barrel 121 together. The bonding section 150 may be a groove or recess located on an outer side of the first lens barrel 111 and the second lens barrel 121 at, for example, where the two barrels are joined. In addition, the bonding adhesive 160 is filled into the groove or recess to fix the first lens barrel 111 and the second lens barrel 121. Accordingly, the misalignment between the first lens group 112 and the second lens group 125 resulted from the shrinkage of the cured bonding adhesive 160 can be avoided, as the bonding adhesive 160 is not directly applied on the contact surfaces of the first lens barrel 111 and the second lens barrel 121, so that the concentricity would not be adversely affected. Besides, the bonding adhesive 160 may be disposed on a side of the first auxiliary contact surface 1112 and the second auxiliary contact surface 1212.

Referring to FIGS. 1A and 1B, in an embodiment, the risk of crashing and damaging the major engagement section 130 during the assembling process may be reduced through the separate auxiliary engagement section 140. Meanwhile, the major engagement section 130 may enable more accurate positioning during the assembling process. Moreover, since the major engagement section 130 and the auxiliary engagement section 140 are respectively provided with the major engagement gap 131 and the auxiliary engagement gap 141, the concentricity of the first submodule 110 and the second submodule 120 may be dynamically modified through relative translational movement or rotation (e.g., by a 5- or 6-degree-of-freedom adjustment) to achieve an optimal imaging quality in a subsequent active alignment to correct the assembling quality of the optical assembly 100. Afterwards, an adhesive dispensing process is performed on the outer side at where the first lens barrel 111 and the second lens barrel 121 are connected, thereby preventing the corrected concentricity of the optical assembly 100 from being affected after adhesive curing.

In the embodiment, the respective numbers of lenses in the first submodule 110 and the second submodule 120 are only described for an illustrative purpose and shall not be construed as a limitation of the invention.

Figure 2:
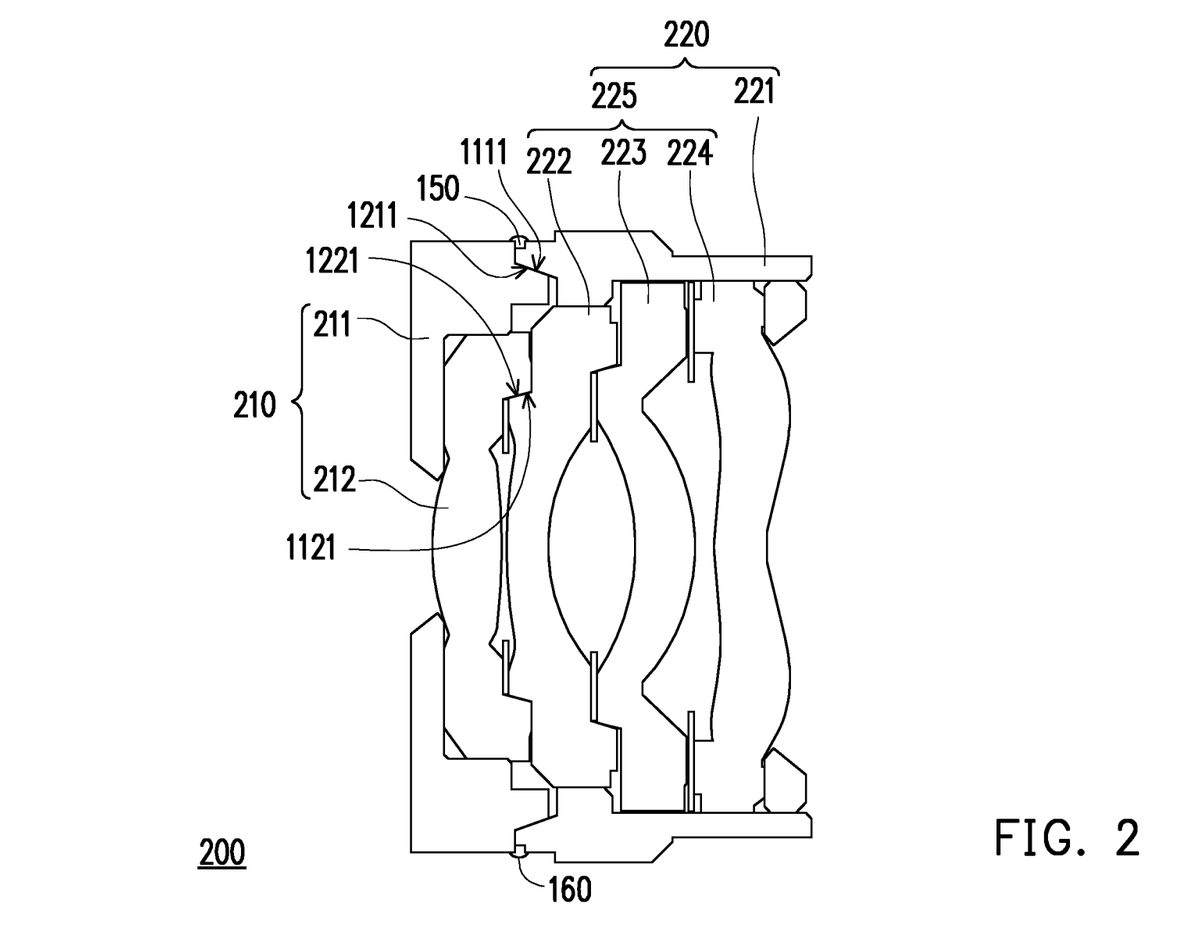
FIG. 2 is a schematic cross-sectional view illustrating an optical assembly according to another embodiment of the invention.

Referring to FIG. 1B, in an embodiment, the first auxiliary lateral surface 1111 of the first lens barrel 111 is arranged on the external side relative to the second auxiliary lateral surface 1211 of the second lens barrel 121, and the first major lateral surface 1121 of the first lens barrel 111 is arranged on the external side relative to the second major lateral surface 1221 of the second lens barrel 121. Nevertheless, referring to FIG. 2, in another embodiment where the optical assembly 200 including a first submodule 210 and a second submodule 220, the first auxiliary lateral surface 1111 of a first lens barrel 211 of the first submodule 210 is arranged on the internal side relative to the second auxiliary lateral surface 1211 of a second lens barrel 221 of the second submodule 220, and the first major lateral surface 1121 of a first lens group 212 is arranged on the external side relative to the second major lateral surface 1221 of a second lens group 225, wherein the second lens group 225 including lenses 222-224. The second major lateral surface 1221 is, for example, disposed on the side of the lens 222 adjacent to the first lens group 212. However, the invention is not limited thereto. In another embodiment, the first major lateral surface 1121 of the first lens group 212 may also be arranged on the internal side relative to the second major lateral surface 1221 of the second lens group 225.

Figure 3:
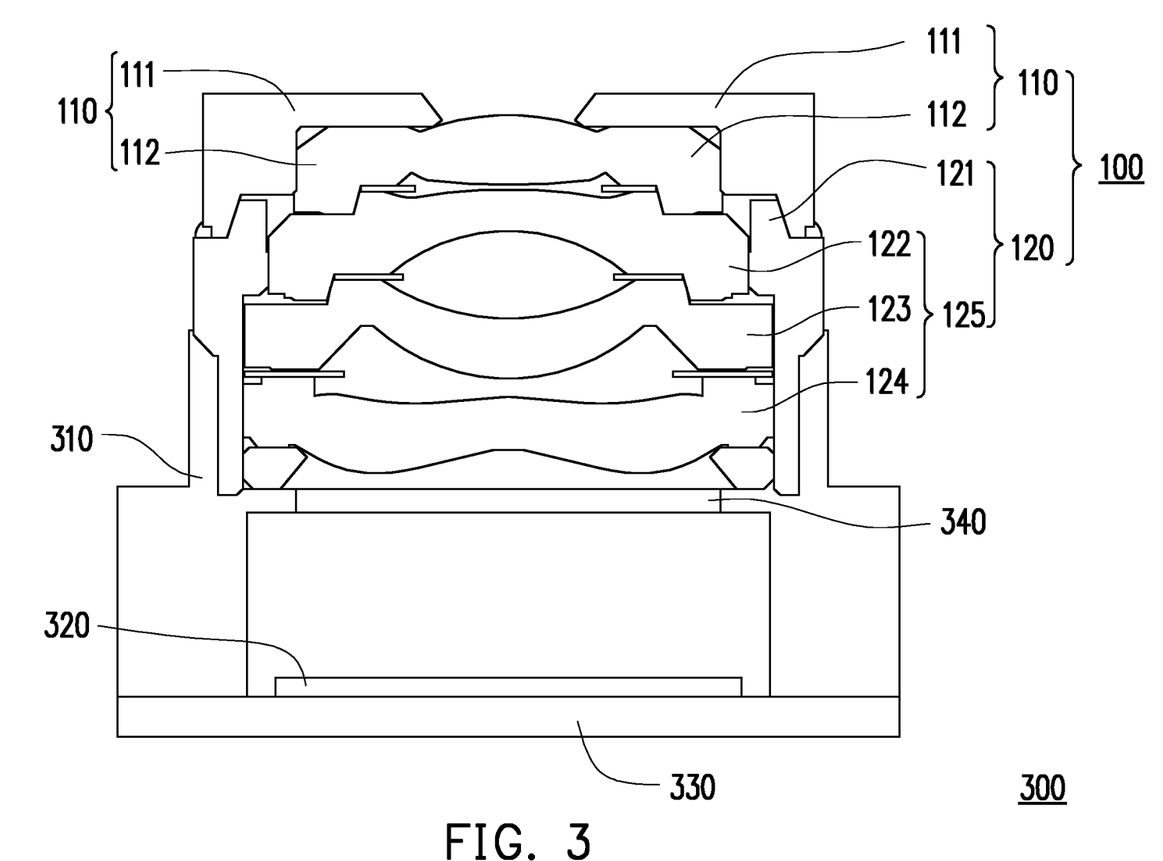
FIG. 3 is a schematic cross-sectional view illustrating a camera module according to an embodiment of the invention.

FIG. 3 is a schematic cross-sectional view illustrating a camera module according to an embodiment of the invention. Referring to FIG. 3, a camera module 300 of the embodiment includes a sensor 320, a holder 310, a filter 340, and the optical assembly 100. The holder 310 is disposed above the sensor 320. The filter 340 is disposed on the holder 310 and between the sensor 320 and the optical assembly 100. For example, the sensor 320 may be disposed on a substrate 330, and the holder 310 may be disposed on the substrate 330 and surround the sensor 320. The optical assembly 100 is disposed on the holder 310 and located above the sensor 320. Details regarding the optical assembly 100 are as described in the foregoing embodiments and thus will not be repeated in the following. In an embodiment, the sensor 320 is an image sensor, such as a charge coupled device (CCD) or a complementary metal oxide semiconductor (CMOS) sensor, and the filter 340 may be a visible bandpass filter, an infrared cut-off filter, an infrared bandpass filter, or a combination thereof.

In view of the foregoing, in the optical assembly and the camera module according to the embodiments of the invention, the lens barrel is divided into two pieces, and the first submodule and the second submodule are assembled through the major engagement section and the auxiliary engagement section, respectively. Therefore, after the first lens group and the second lens group are respectively placed into the first lens barrel and the second lens barrel, the position or orientation of the first lens group of the first submodule and the second lens group of the second submodule is still adjustable through translationally moving or rotating the lens barrels. The concentricity of lenses can thus be further optimized after the lenses are placed into the lens barrels. Consequently, the optical assembly and the camera module according to the embodiments of the invention are provided with an improved yield and reliability. Furthermore, in the embodiments of the invention, the orthogonal projection length of the major lateral surface of the major engagement section onto the normal of the major contact surface is designed to be less than the orthogonal projection length of the auxiliary lateral surface of the auxiliary engagement section onto the normal of the auxiliary lateral surface, thereby reducing the risk that the lenses are damaged. Thus, the defective products may be reduced during the assembling process of the module.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical assembly, comprising:
   a first submodule, comprising a first lens barrel and a first lens group disposed in the first lens barrel, wherein the first lens group has a first lens group engagement mechanism and the first lens barrel has a first lens barrel engagement mechanism; and a second submodule, comprising a second lens barrel and a second lens group disposed in the second lens barrel, wherein the second lens group has a second lens group engagement mechanism and the second lens barrel has a second lens barrel engagement mechanism, wherein the first lens barrel engagement mechanism and the second lens barrel engagement mechanism are assembled to form a lens barrel engagement section, and the first lens group engagement mechanism and the second lens group engagement mechanism are assembled to form a lens group engagement section, one of the first lens group engagement mechanism and the second lens group engagement mechanism is inserted into the other of the first lens group engagement mechanism and the second lens group engagement mechanism, and fitting between the first lens group engagement mechanism and the second lens group engagement mechanism is tighter than fitting between the first lens barrel engagement mechanism and the second lens barrel engagement mechanism.

2. The optical assembly as claimed in claim 1, wherein the first lens group engagement mechanism has a first lens group contact surface and a first lens group lateral surface connected to the first lens group contact surface, the second lens group engagement mechanism has a second lens group contact surface and a second lens group lateral surface connected to the second lens group contact surface, the first lens barrel engagement mechanism has a first lens barrel contact surface and a first lens barrel lateral surface connected to the first lens barrel contact surface, and the second lens barrel engagement mechanism has a second lens barrel contact surface and a second lens barrel lateral surface connected to the second lens barrel contact surface, wherein the first lens group engagement mechanism and the second lens group engagement mechanism form the lens group engagement section by the first lens group contact surface and the second lens group contact surface contacting each other, and the first lens barrel engagement mechanism and the second lens barrel engagement mechanism form the lens barrel engagement section by the first lens barrel contact surface and the second lens barrel contact surface contacting each other.

3. The optical assembly as claimed in claim 2, wherein a lens group engagement gap is formed between the first lens group lateral surface and the second lens group lateral surface, and a lens barrel engagement gap is formed between the first lens barrel lateral surface and the second lens barrel lateral surface, wherein a gap width of the lens barrel engagement gap in a normal direction of the first lens barrel lateral surface is greater than a gap width of the lens group engagement gap in a normal direction of the first lens group lateral surface.

4. The optical assembly as claimed in claim 3, wherein the optical assembly satisfies relations as follows: 0 μm<G1<50 μm, and 0.05 mm<G2<1 mm, wherein G1 is a gap width of the lens group engagement gap in a normal direction of the first lens group lateral surface, and G2 is a gap width of the lens barrel engagement gap in a normal direction of the first lens barrel lateral surface.

5. The optical assembly as claimed in claim 2, wherein the first lens group lateral surface is inclined relative to the first lens group contact surface, the second lens group lateral surface is inclined relative to the second lens group contact surface, the first lens barrel lateral surface is inclined relative to the first lens barrel contact surface, and the second lens barrel lateral surface is inclined relative to the second lens barrel contact surface.

6. The optical assembly as claimed in claim 2, wherein the first lens group contact surface and the second lens group contact surface are parallel to each other, and the first lens barrel contact surface and the second lens barrel contact surface are parallel to each other.

7. The optical assembly as claimed in claim 2, wherein an orthogonal projection length of an orthogonal projection of the first lens group lateral surface of the first lens group engagement mechanism onto a normal of the first lens group contact surface is less than an orthogonal projection length of an orthogonal projection of the first lens barrel lateral surface of the first lens barrel engagement mechanism onto a normal of the first auxiliary lens barrel contact surface.

8. The optical assembly as claimed in claim 1, wherein a bonding section is arranged between the first lens barrel and the second lens barrel in a position other than the first lens group engagement mechanism and the second lens group engagement mechanism.

9. A camera module, comprising:

a sensor;

a holder disposed above the sensor; and an optical assembly disposed on the holder and above the sensor, and comprising:

a first submodule, comprising a first lens barrel and a first lens group disposed in the first lens barrel, wherein the first lens group has a first lens group engagement mechanism and the first lens barrel has a first lens barrel engagement mechanism; and a second submodule, comprising a second lens barrel and a second lens group disposed in the second lens barrel, wherein the second lens group has a second lens group engagement mechanism and the second lens barrel has a second lens barrel engagement mechanism, wherein the first lens barrel engagement mechanism and the second lens barrel engagement mechanism are assembled to form a lens barrel engagement section, and the first lens group engagement mechanism and the second lens group engagement mechanism are assembled to form a lens group engagement section, one of the first lens group engagement mechanism and the second lens group engagement mechanism is inserted into the other of the first lens group engagement mechanism and the second lens group engagement mechanism, and fitting between the first lens group engagement mechanism and the second lens group engagement mechanism is tighter than fitting between the first lens barrel engagement mechanism and the second lens barrel engagement mechanism.

10. The camera module as claimed in claim 9, wherein the first lens group engagement mechanism of the optical assembly has a first lens group contact surface and a first lens group lateral surface connected to the first lens group contact surface, the second lens group engagement mechanism has a second lens group contact surface and a second lens group lateral surface connected to the second lens group contact surface, the first lens barrel engagement mechanism has a first lens barrel contact surface and a first lens barrel lateral surface connected to the first lens barrel contact surface, and the second lens barrel engagement mechanism has a second lens barrel contact surface and a second lens barrel lateral surface connected to the second lens barrel contact surface, wherein the first lens group engagement mechanism and the second lens group engagement mechanism form the lens group engagement section by the first lens group contact surface and the second lens group contact surface contacting each other, and the first lens barrel engagement mechanism and the second lens barrel engagement mechanism form the lens barrel engagement section by the first lens barrel contact surface and the second lens barrel contact surface contacting each other.

11. The camera module as claimed in claim 10, wherein a lens group engagement gap is formed between the first lens group lateral surface and the second lens group lateral surface, and a lens barrel engagement gap is formed between the first lens barrel lateral surface and the second lens barrel lateral surface, wherein a gap width of the lens barrel engagement gap in a normal direction of the first lens barrel lateral surface is greater than a gap width of the lens group engagement gap in a normal direction of the first lens group lateral surface.

12. The camera module as claimed in claim 10, wherein in the optical assembly, the first lens group lateral surface is inclined relative to the first lens group contact surface, the second lens group lateral surface is inclined relative to the second lens group contact surface, the first lens barrel lateral surface is inclined relative to the first lens barrel contact surface, and the second lens barrel lateral surface is inclined relative to the second lens barrel contact surface.

13. The camera module as claimed in claim 11, wherein the optical assembly satisfies relations as follows: $0\ \mu m < G1 < 50\ \mu m$ and $0.05\ mm < G2 < 1\ mm$, wherein G1 is a gap width of the lens group engagement gap in a normal direction of the first lens group lateral surface, and G2 is a gap width of the lens barrel engagement gap in a normal direction of the first lens barrel lateral surface.

14. The camera module as claimed in claim 10, wherein the first lens group contact surface and the second lens group contact surface are parallel to each other, and the first lens barrel contact surface and the second lens barrel contact surface of the optical assembly are parallel to each other.

15. The camera module as claimed in claim 10, wherein in the optical assembly, an orthogonal projection length of an orthogonal projection of the first lens group lateral surface of the first lens group engagement mechanism onto a normal of the first lens group contact surface is less than an orthogonal projection length of an orthogonal projection of the first lens barrel lateral surface of the first lens barrel engagement mechanism onto a normal of the first lens barrel contact surface.

16. The camera module as claimed in claim 9, wherein a bonding section is arranged between the first lens barrel and the second lens barrel of the optical assembly in a position other than the first lens group engagement mechanism and the second lens group engagement mechanism.

17. The optical assembly as claimed in claim 1, wherein one of the first lens barrel engagement mechanism and the second lens barrel engagement mechanism is inserted into the other of the first lens barrel engagement mechanism and the second lens barrel engagement mechanism.

18. The camera module as claimed in claim 9, wherein one of the first lens barrel engagement mechanism and the second lens barrel engagement mechanism is inserted into the other of the first lens barrel engagement mechanism and the second lens barrel engagement mechanism.

19. The optical assembly as claimed in claim 1, wherein the first lens group includes a first lens group contact surface and a first lens group lateral surface connected to the first lens group contact surface, the second lens group includes a second lens group contact surface contacting the first lens group contact surface and a second lens group lateral surface connected to the second lens group contact surface and facing the first lens group lateral surface with a lens group engagement gap therebetween, and the first lens group lateral surface and the second lens group lateral surface partially overlap in an arrangement direction of the first lens group and the second lens group.

* * * * *